(12) United States Patent
Araki

(10) Patent No.: US 7,158,322 B2
(45) Date of Patent: Jan. 2, 2007

(54) LENS DEVICE AND METHOD FOR ADJUSTING THE SAME

(75) Inventor: Takao Araki, Saitama (JP)

(73) Assignee: Fujinon Corporation, Saitama (JP)

( * ) Notice: Subject to any disclaimer, the term of this patent is extended or adjusted under 35 U.S.C. 154(b) by 85 days.

(21) Appl. No.: 11/094,105

(22) Filed: Mar. 31, 2005

(65) Prior Publication Data

US 2005/0231831 A1    Oct. 20, 2005

(30) Foreign Application Priority Data

Mar. 31, 2004    (JP)    ............... 2004-105507

(51) Int. Cl.
*G02B 7/02*    (2006.01)
*G02B 15/14*    (2006.01)

(52) U.S. Cl. ............... 359/823; 359/699; 359/826

(58) Field of Classification Search ............... 359/823, 359/699, 700, 825, 826
See application file for complete search history.

(56) References Cited

U.S. PATENT DOCUMENTS 7,050,244 B1 *    5/2006    Hayashi et al. ............... 359/701

2003/0026005 A1 *    2/2003    Suzuki ............... 359/699

FOREIGN PATENT DOCUMENTS

| JP | 11-326734 | 11/1999 |
|----|-----------|---------|
| JP | 2000-321476 | 11/2000 |
| JP | 2003-202479 | 7/2003 |

* cited by examiner

*Primary Examiner*—Ricky Mack
*Assistant Examiner*—M. Hasan
(74) *Attorney, Agent, or Firm*—Young & Thompson

(57)    ABSTRACT

To provide a lens device involving simple adjustment work and an adjustment method for the same, the lens device includes the first and second lens groups, each including having a retaining guide section on a surface facing another of the first and second lens groups, wherein the retaining guide section of one of the first and second lens groups retains and guides the other of the first and second lens groups so that the other of the first and second lens groups can rotate around the optical axis in the rotary cylinder.

2 Claims, 5 Drawing Sheets

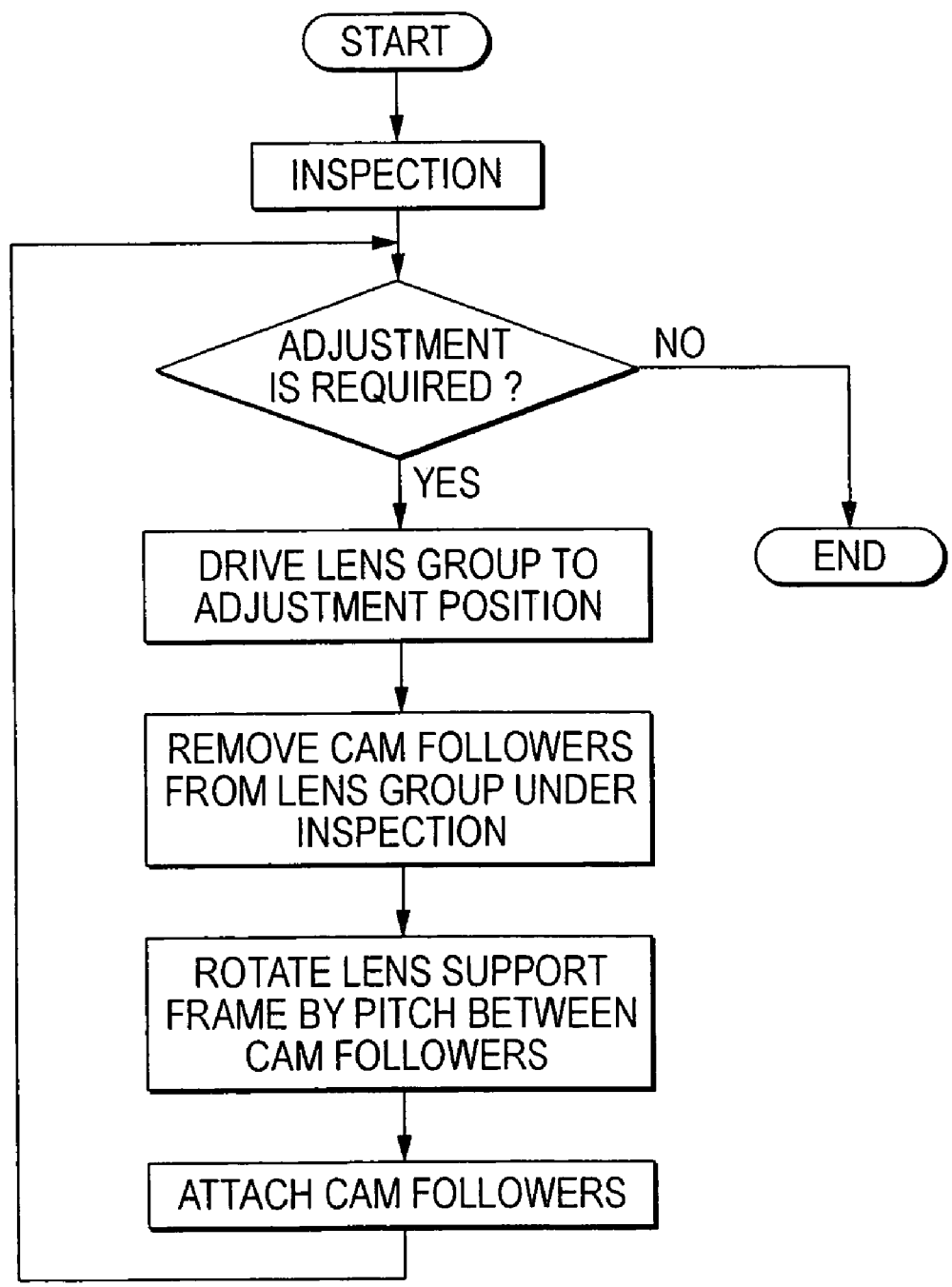

LENS DEVICE AND METHOD FOR ADJUSTING THE SAME

FIELD OF THE INVENTION

The present invention relates to a lens device which comprises a plurality of lens groups built in a rotary cylinder and which moves the lens groups in the direction of an optical axis by means of rotation of the rotary cylinder, as well as to an improvement in a method for adjusting the lens device.

BACKGROUND OF THE INVENTION

A zoom lens device which enables acquisition of different focal distances through use of a single lens device has hitherto been used in an optical product, such as a camera or a projector. For instance, as described in JP-A-11-326734, JP-A-2000-321476 and JP-A-2003-202479, a plurality of lens groups are built in a lens barrel, and the lens groups are moved along the direction of the optical axis, thereby effecting scaling action and focusing.

Each of the lens groups is constituted of at least one lens, and an annular lens support frame for supporting the lens. For example, three bosses are provided upright on an outer periphery of the lens support frame while being radially spaced at uniform angular intervals of 120°, and a columnar cam follower is attached to each of the bosses. The lens barrel is formed from a zoom cam cylinder and a fixed cylinder. A plurality of curved cam grooves into which the cam followers of the respective lens groups are inserted are formed in the zoom cam cylinder, and a plurality of linear cam grooves aligned with the direction of the optical axis are formed in the fixed cylinder. When the zoom cam cylinder is rotated, the cam followers are pressed by the curved cam grooves, whereupon the respective lens groups are moved in the direction of a projecting optical axis along the linear cam grooves of the fixed cylinder.

The zoom cam cylinder and the lens support frame are formed from plastic by means of injection molding or the like. Slight, rather than great, variations arise in positions of a molded article where the cam grooves or the cam followers are to be formed. For these reasons, there sometimes arises a case where lens groups built in the lens barrel become tilted with reference to the projection optical axis, or a case where the center of the lenses comes out of alignment with the projection optical axis. The related-art zoom lens device is subjected to inspection after the lens groups have been incorporated in the lens barrel. In accordance with the result of inspection, the lens groups in the lens barrel are rotated through an angle at which the cam followers are spaced from each other around the projection optical axis; that is, an angle of 120°, thereby changing a combination of the cam grooves and the cam followers. Thus, the tilt of the lens groups with reference to the projection optical axis is adjusted.

However, in the case of the zoom lens device wherein, e.g., three bosses and cam followers are provided upright on the outer periphery of the lens support frame while being radially spaced apart at a uniform angular interval of 120° and wherein the lens support frame is supported by the lens barrel by means of the bosses, the three bosses attached to the lens group must once be removed to rotate the lens group by the amount corresponding to the pitch between the cam followers. In that case, unless the lens group is pressed by a jig or the like, the lens group will fall. For this reason, when the center lens group in the zoom lens device into which three or more lens groups are built is subjected to rotational adjustment, the outer lens groups must be removed from the lens barrel for inserting a jig or the like, thereby deteriorating working efficiency.

SUMMARY OF THE INVENTION

The present invention is intended for resolving the above-described drawback, and an object of the present invention is to providing a lens device involving simple adjustment operation and an adjustment method.

A lens device of the present invention is provided with a retaining guide section on a lens support frame constituting a lens group. The retaining guide section retains a lens support frame of an adjacent lens group and guides the lens group so as to allow rotation of the adjacent lens group around a projection optical axis.

A lens adjustment method of the present invention includes: bringing first and second lens groups in close contact with each other in a direction of an optical axis; removing cam followers from one lens group (e.g. the first lens group) requiring adjustment through cam grooves; retaining the one lens group, which cam followers have been removed, by means of the retaining guide section of the other lens group (e.g. the second lens group); rotating the one lens group within the rotary cylinder by the amount corresponding to a pitch between the cam followers; and again attaching the cam followers to the one lens group.

According to a lens device and a lens adjustment method of the present invention, when, for example, a combination of cam followers of a center lens group with cam grooves in a lens device having three or more lens groups requires adjustment, the center lens group can be rotated around the projection optical axis within the rotary cylinder without removing the outer lens group from the rotary cylinder. As a result, the efficiency of adjustment work is improved. Moreover, during assembly of the lens device, another lens group can be incorporated while the first-inserted lens groups are taken as guides, and therefore efficiency of assembly work can also be improved.

BRIEF DESCRIPTION OF THE DRAWINGS

FIG. 5 is a flowchart showing procedures of a method for adjusting the zoom lens device in an embodiment of the present invention.

DETAILED DESCRIPTION OF THE INVENTION

Figure 1:
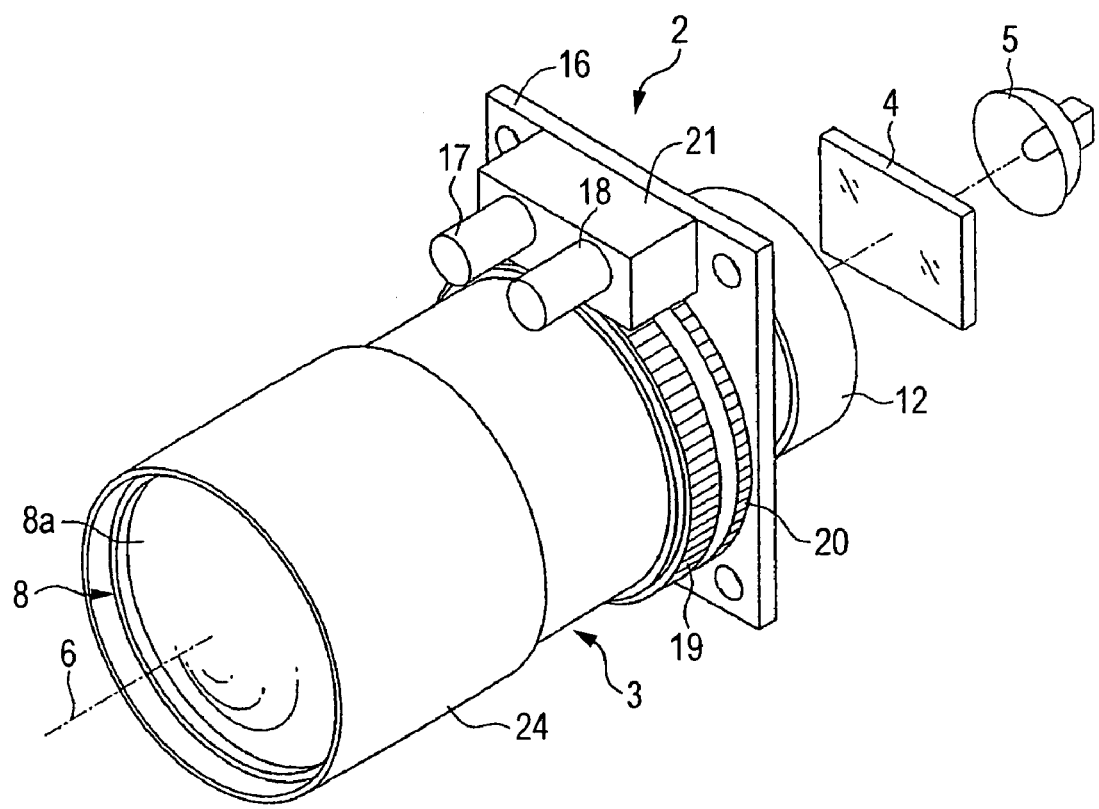
FIG. 1 is a schematic diagram showing the configuration of a projector.

FIG. 1 is a schematic diagram showing the configuration of a projector using a lens device of the present invention. A projector 2 is a translucent liquid-crystal projector constituted of a zoom lens device 3, a translucent liquid-crystal panel 4, and an illumination lamp 5. On the basis of an input video signal, an image is displayed on the translucent liquid-crystal panel 4. The illumination lamp 5 emits illumination light on the translucent liquid-crystal panel 4 from behind. The illumination light having passed through the liquid-crystal panel 4 is projected on a screen by means of the zoom lens device 3, whereby the image is displayed.

Figure 2:
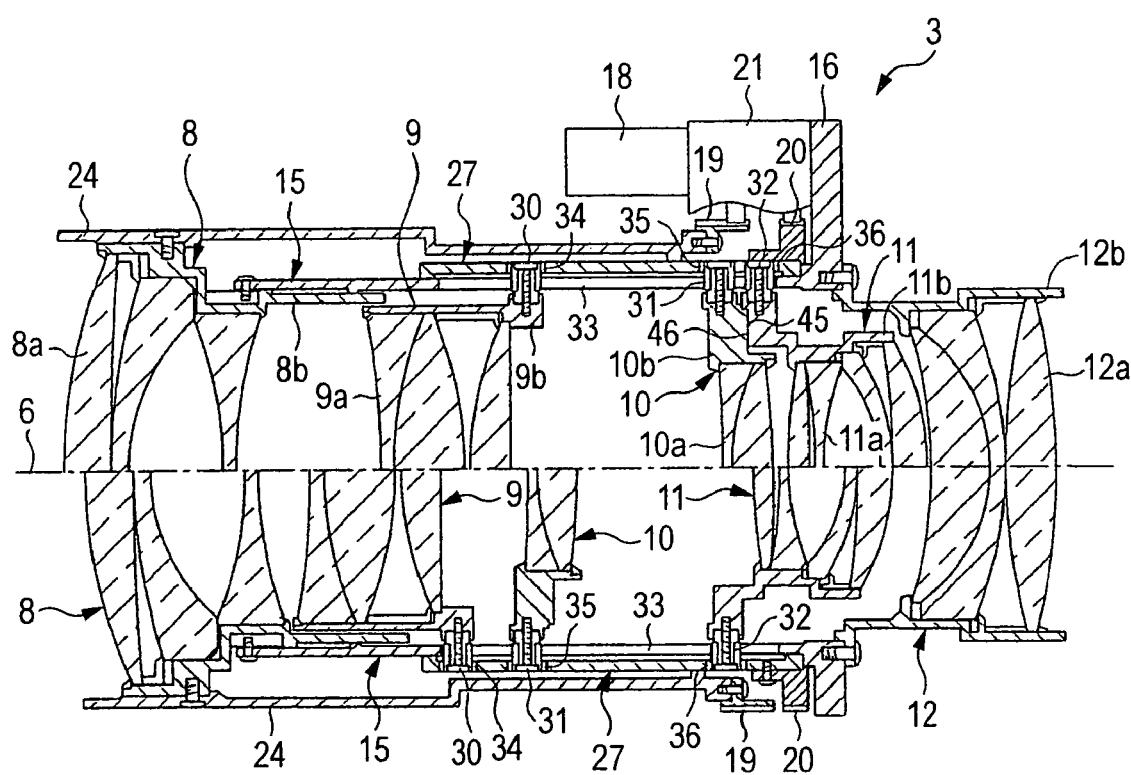
FIG. 2 is a cross-sectional view of a zoom lens device in an embodiment of the present invention.

FIG. 2 is a cross-sectional view of the principal section showing the configuration of the zoom lens device 3 in an embodiment of the present invention. An adjustment state used for adjusting the zoom lens device 3 is shown above a projection optical axis (i.e., an optical axis) 6, and a telescopic state of the zoom lens device 3 is shown below the projection optical axis 6. The zoom lens device 3 has, as an optical system, a lens group A (8) acting as a focus lens; a lens group B (9) acting as a variator; lens groups C and D (10, 11) acting as a compensator; and a lens group E (12) acting as a release lens. The lens groups 8 to 12 comprise a plurality of lenses 8a to 12a and annular lens support frames 8b to 12b for supporting the lenses 8a to 12a.

The lens group A (8) to the lens group D (11) are built in a fixed cylinder 15. A rectangular flange 16 used for fixing the zoom lens device 3 within the projector 2 is formed integrally at the rear end of the fixed cylinder 15. The lens support frame 12b of the lens group E (12) is mounted on the back of the flange 16. Attached on an upper part of the flange 16 are a focus motor 17 for moving the lens group A (8) in the direction of the projection optical axis 6; a zoom motor 18 for moving the lens groups B to D (9 to 11) in the direction of the optical axis 6; and a gear box 21 for transmitting rotation of the motors 17, 18 to a focus link gear 19 and a zoom link gear 20.

A female helicoid is formed on an inner periphery of the extremity of the fixed cylinder 15, and a male helicoid is formed on an outer periphery of the extremity of the lens support frame 8b of the lens group A (8). Therefore, when the lens group A (8) is rotated, the lens group A (8) advances or recedes in the direction of the optical axis by means of a lead of the helicoids, thereby adjusting a focus. The lens group A (8) is rotated by means of a focus cylinder fixed to the outside of the lens support frame 8b; the focus ring gear 19 which is attached to the rear end of a focus cylinder 24 and rotates along the outer periphery of the fixed cylinder 15; and the focus motor 17 which rotates the focus link gear 19 by way of the gear box 21.

A rotary cylinder 27 which rotates along the outer periphery of the fixed cylinder 15 is interposed between the fixed cylinder 15 and the focus cylinder 24. The zoom link gear 20 is latched at the rear end of the rotary cylinder 27, and rotation of the zoom motor 18 is transmitted to the zoom link gear 20 by way of the gear box 21.

Cam followers 30 to 32, which are radially provided on the outer peripheries of the lens support frames 9b to 11b of the lens groups B to D (9 to 11) while being spaced apart from each other at uniform pitches on the respective outer peripheries, are inserted into a linearly-advancement cam groove 33 formed in the outer peripheral surface of the fixed cylinder 15. Three of zoom cam grooves 34 to 36 into which are to be inserted the respective cam followers 30 to 32 of the lens groups B to D (9 to 11) projecting from the linearly-advancement cam are formed, each in a number of three, in the outer peripheral surface of the rotary cylinder 27.

The zoom cam grooves 34 to 36 are formed on the outer periphery of the projection optical axis 6 in an essentially helical pattern. The cam followers 30 to 32 of the lens groups B to D (9 to 11) are pressed by rotation of the rotary cylinder 27, thereby moving the lens groups B to D (9 to 11) in the direction of the projection optical axis 6. The linearly-advancement cam groove 33 is formed along the direction of the projection optical axis 6 and acts as a translatory-moving guide for effecting regulation such that the respective cam followers 30 to 33 move in only the direction of the optical axis 6.

Figure 3:
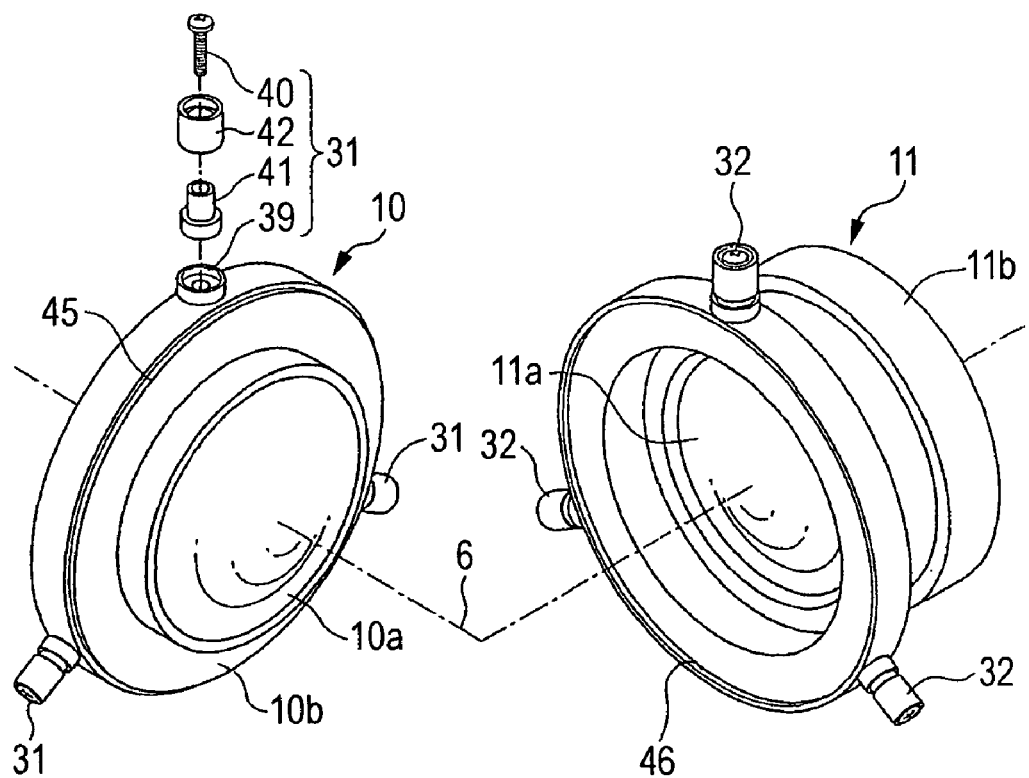
FIG. 3 is an appearance perspective view showing a convex retaining guide section of a lens group C and a concave retaining guide section of a lens group D in an embodiment of the present invention.
Figure 4A:
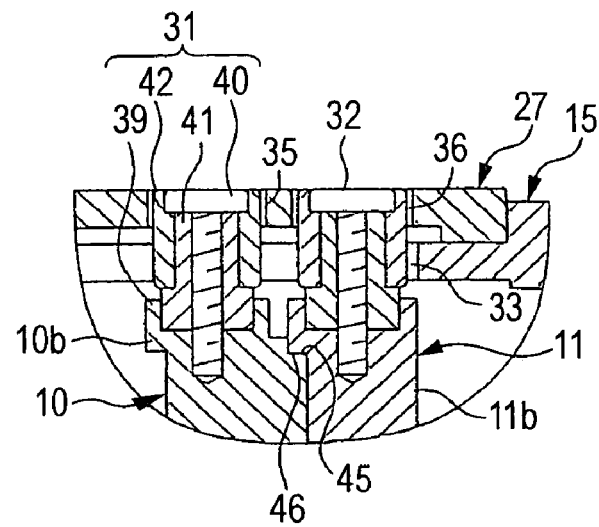
FIGS. 4A and 4B are cross-sectional views of the principal section showing engagement between the convex retaining guide section of the lens group C and the concave retaining guide section of the lens group D in an embodiment of the present invention.

As shown in FIGS. 3 and 4A, the cam followers 31 of the lens group C (10) comprise three bosses 39 formed on the outer periphery of the lens support frame 10a so as to be spaced from each other at uniform angular intervals. Each of the cam followers 31 further comprises a sleeve 41 fixed on the boss 39 by means of a screw 40, and a cam roller 42 rotatably held between the sleeve 41 and the screw 40. The cam roller 42 rotates within the linearly-advancement cam groove 33 and the zoom cam groove 35, thereby reducing resistance that arises during sliding action. Since the cam followers 30, 32 of the lens group B (9) and the lens group D (11) assume the same configuration, their detailed explanations are omitted.

A circular convex retaining guide section 45 projecting toward the lens group D (11) is formed on a surface of the lens support frame 10a of the lens group C (10), the surface facing to the lens group D (11). A circular concave retaining guide section 46 formed from a circular depression is formed on a surface of the lens support frame 11a of the lens group D (11), the surface facing to the lens group C (10). The diameter of the convex retaining guide section 45 and that of the concave retaining guide section 46 are determined so as to gently fit together to such an extent that the lens support frames can mutually rotate.

As shown in FIG. 2, when the zoom lens device 3 is brought into a state where the lens device has been moved further toward the wide side than the wide end, the lens group C (10) and the lens group D (11) are moved toward the rear end of the zoom lens device 2. Moreover, the convex retaining guide section 45 of the lens group C (10) is inserted into the concave retaining guide section 46 of the lens group D (11).

Figure 4B:
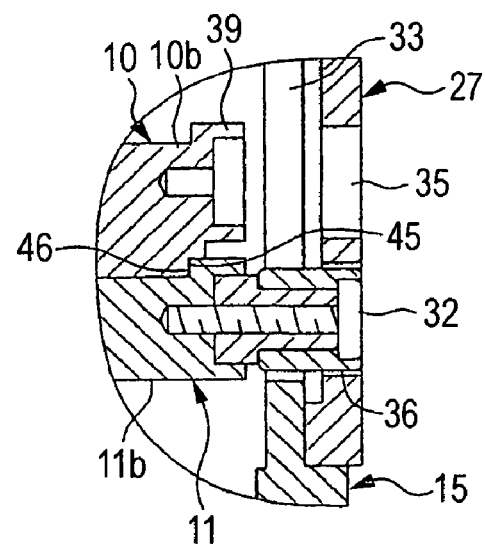

For instance, the zoom lens device 3 remaining in the adjusted state is brought into an upright position such that the lens group A (8) is oriented upward. As shown in FIG. 4B, as a result of the cam followers 31 of the lens group C (10) being removed from the lens support frame 10a, the lens group C (10) is retained by the concave retaining guide section 46 of the lens group D (11). Further, the convex retaining guide section 45 and the concave retaining guide section 46 are formed into a circular shape. Hence, the fixed cylinder 15 and the lens group C (10) in the rotary cylinder 27 can be rotated from the outside by use of a jig or the like.

During the process for adjusting the zoom lens device 3, when the combination of the cam followers 31 of the lens group C (10) with the cam groove 35 is changed, only the lens group C (10) can be rotated within the fixed cylinder 15 and the rotary cylinder 27 without removal of the lens group A (8), the lens group B (9), the lens group D (11), and the lens group E (12), to thus enhance efficiency of adjustment work. When the zoom lens device 3 is brought into an upright position such that the lens group A (8) is oriented downward, the lens group D(11) can be retained by the lens group C (10). Hence, similarly, work for adjusting the lens group D (11) can also be simplified.

Next, a method for adjusting the zoom lens device 3 will be described by reference to a flowchart shown in FIG. 5. The zoom lens device 3 having finished undergone assembly is set on inspection equipment. In addition to performing tests for the focus and zoom of the lens groups A to E (8 to 12), this inspection equipment performs tests for alignment of the centers of the lenses 8a to 12a of the lens groups A to E (8 to 12) with the center of the projection optical axis 6 and tests as to whether or not the lens groups A to E (8 to 12) are inclined with reference to the projection optical axis 6.

When the centers of the lenses of the lens groups are out of alignment with the center of the projection optical axis or when the lens groups are incorporated at an angle to the projection optical axis 6, variations are considered to exist in the manufacturing accuracy of the cam followers of the lens groups or that of the zoom cam groove of the rotary cylinder 27. In such an event, there may be a case where the lens can be properly adjusted by changing the combination of the cam followers with the zoom cam groove.

For instance, when the lens group C (10) is mounted at an angle to the projection optical axis, the zoom lens device 3 is set in an adjustment state, as shown in FIGS. 2 and 4A, thereby bringing the lens groups C and D (10, 11) into close contact with each other. As a result, the convex retaining guide section 45 of the lens group C (10) is inserted into the concave retaining guide section 46 of the lens group D (11).

As shown in FIG. 4B, the zoom lens device 3 is brought into an upright position such that the lens group A (8) faces upward, and the cam followers 31 are removed from the lens support frame 10a through the linearly-advancement cam groove 33 and the zoom cam groove 35. The lens group C (10) is retained by the lens group D (11) by means of engagement of the convex retaining guide section 45 with the concave retaining guide section 46, and is guided so as to be able to rotate around the projection optical axis 6.

In this state, when the lens group C (10) is rotated by one pitch between the cam follower 31 from the outside of the fixed cylinder 15 and the rotary cylinder 27 through use of a jig or a tool, the bosses 39 of the lens support frame 10b again face the linearly-advancement cam groove 33 and the zoom cam groove 35. Therefore, when the cam followers 31 are again attached, the combination of the cam followers 31 with the zoom cam groove 35 can be easily changed without involvement of disassembly of the zoom lens device 3, so that the zoom lens device 3 can be adjusted to an appropriate state.

In the previous embodiment, only the lens groups C and D (10 and 11) are provided with the retaining guide sections. However, all the lens groups may be provided with the retaining guide sections. Further, although the zoom lens device of the projector has already been described as an example, the present invention can also be applied to a lens device of a camera or that of an optical instrument.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

The present application claims foreign priority based on Japanese Patent Application No. JP2004-105507, filed Mar. 31 of 2004, the contents of which is incorporated herein by reference.

What is claimed is:

1. A lens device comprising:
   at least two lens groups, each of the at least two lens groups comprising: a lens; and a lens frame that supports the lens, the lens frame having a plurality of cam followers disposed on an outer periphery of the lens frame at substantially uniform pitches;
   a rotary cylinder having a plurality of cam grooves in an outer periphery of the rotary cylinder, wherein the cam followers are inserted into the cam grooves so that when the rotary cylinder rotates around an optical axis, the cam grooves press the cam followers to move the at least two lens groups in a direction of the optical axis; and
   a translatory-moving guide that regulates a movement of the cam followers in the direction of the optical axis,
   wherein
   the at least two lens groups comprise a first lens group and a second lens group, each of the first and second lens groups having a retaining guide section on a surface facing another of the first and second lens groups, wherein the retaining guide section of one of the first and second lens groups retains and guides the other of the first and second lens groups so that the other of the first and second lens groups can rotate around the optical axis in the rotary cylinder.

2. A method for adjusting a lens device according to claim 1, which comprises:
   bringing the first lens group into close contact with the second lens group in a direction of an optical axis;
   removing cam followers from the first lens group through cam grooves of the rotary cylinder, the first lens group requiring an adjustment of a combination of the cam followers with the cam grooves;
   retaining the first lens group by a retaining guide section of the second lens group;
   rotating the first lens group within the rotary cylinder by a pitch between the cam followers; and
   attaching the cam followers to the first lens group through the cam grooves, so as to change the combination of the cam followers with the cam grooves.

* * * * *